United States Patent
Thyagarajan et al.

(10) Patent No.: US 11,620,224 B2
(45) Date of Patent: Apr. 4, 2023

(54) INSTRUCTION CACHE PREFETCH THROTTLE

(71) Applicant: Advanced Micro Devices, Inc., Santa Clara, CA (US)

(72) Inventors: Aparna Thyagarajan, Santa Clara, CA (US); Ashok Tirupathy Venkatachar, Santa Clara, CA (US); Marius Evers, Santa Clara, CA (US); Angelo Wong, Santa Clara, CA (US); William E. Jones, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/709,831

(22) Filed: Dec. 10, 2019

(65) Prior Publication Data

US 2021/0173783 A1 Jun. 10, 2021

(51) Int. Cl.
*G06F 12/0862* (2016.01)
*G06F 12/0875* (2016.01)

(52) U.S. Cl.
CPC ...... *G06F 12/0862* (2013.01); *G06F 12/0875* (2013.01); *G06F 2212/1021* (2013.01); *G06F 2212/602* (2013.01)

(58) Field of Classification Search
CPC ......... G06F 12/0862; G06F 2212/1021; G06F 2212/602
See application file for complete search history.

(56) References Cited

U.S. PATENT DOCUMENTS

| | | | |
|---|---|---|---|
| 2008/0082753 A1* | 4/2008 | Licht | G06F 9/3814 711/128 |
| 2009/0150657 A1* | 6/2009 | Gschwind | G06F 9/3804 712/239 |
| 2009/0217015 A1* | 8/2009 | Alexander | G06F 9/3838 712/239 |
| 2009/0300340 A1 | 12/2009 | Chou et al. | |
| 2013/0339693 A1* | 12/2013 | Bonanno | G06F 9/30047 712/238 |
| 2013/0346703 A1 | 12/2013 | McCauley et al. | |
| 2014/0136795 A1 | 5/2014 | Tang et al. | |
| 2014/0372736 A1* | 12/2014 | Greenhalgh | G06F 9/3806 712/239 |
| 2017/0090935 A1 | 3/2017 | Falsafi et al. | |
| 2018/0004670 A1* | 1/2018 | Sudhir | G06F 12/0862 |
| 2020/0004543 A1* | 1/2020 | Kumar | G06F 9/3806 |

FOREIGN PATENT DOCUMENTS

WO 2018-142140 A1 8/2018

* cited by examiner

*Primary Examiner* — Andrew J Cheong
(74) *Attorney, Agent, or Firm* — Volpe Koenig

(57) ABSTRACT

Techniques for controlling prefetching of instructions into an instruction cache are provided. The techniques include tracking either or both of branch target buffer misses and instruction cache misses, modifying a throttle toggle based on the tracking, and adjusting prefetch activity based on the throttle toggle.

24 Claims, 4 Drawing Sheets

INSTRUCTION CACHE PREFETCH THROTTLE

BACKGROUND

In a microprocessor, instructions are fetched for execution sequentially until a branch occurs. A branch causes a change in the address from which instructions are fetched and may be associated with delays in instruction fetch throughput. For example, branches may need to be evaluated to determine whether to take the branch as well as what the branch destination is. However, branches cannot be evaluated until the branch has entered the instruction execution pipeline. Branch delays are associated with the difference between the time that the branch is fetched and the time that the branch is evaluated to determine the outcome of that branch and thus what instructions need to be fetched next.

Branch prediction helps to mitigate this delay by predicting the existence and outcome of a branch instruction based upon instruction address. A branch target buffer stores information that associates program counter addresses with branch targets. The existence of an entry in the branch target buffer implicitly indicates that a branch exists at the program counter associated with that entry. An instruction fetch unit may prefetch instructions into an instruction cache based on the contents of a branch target buffer. Corrections to the branch target buffer are frequently being made.

BRIEF DESCRIPTION OF THE DRAWINGS

A more detailed understanding may be had from the following description, given by way of example in conjunction with the accompanying drawings wherein.

DETAILED DESCRIPTION

Techniques for controlling prefetching of instructions into an instruction cache are provided. The techniques include tracking either or both of branch target buffer misses and instruction cache misses, modifying a throttle toggle based on the tracking, and adjusting prefetch activity based on the throttle toggle.

Figure 1:
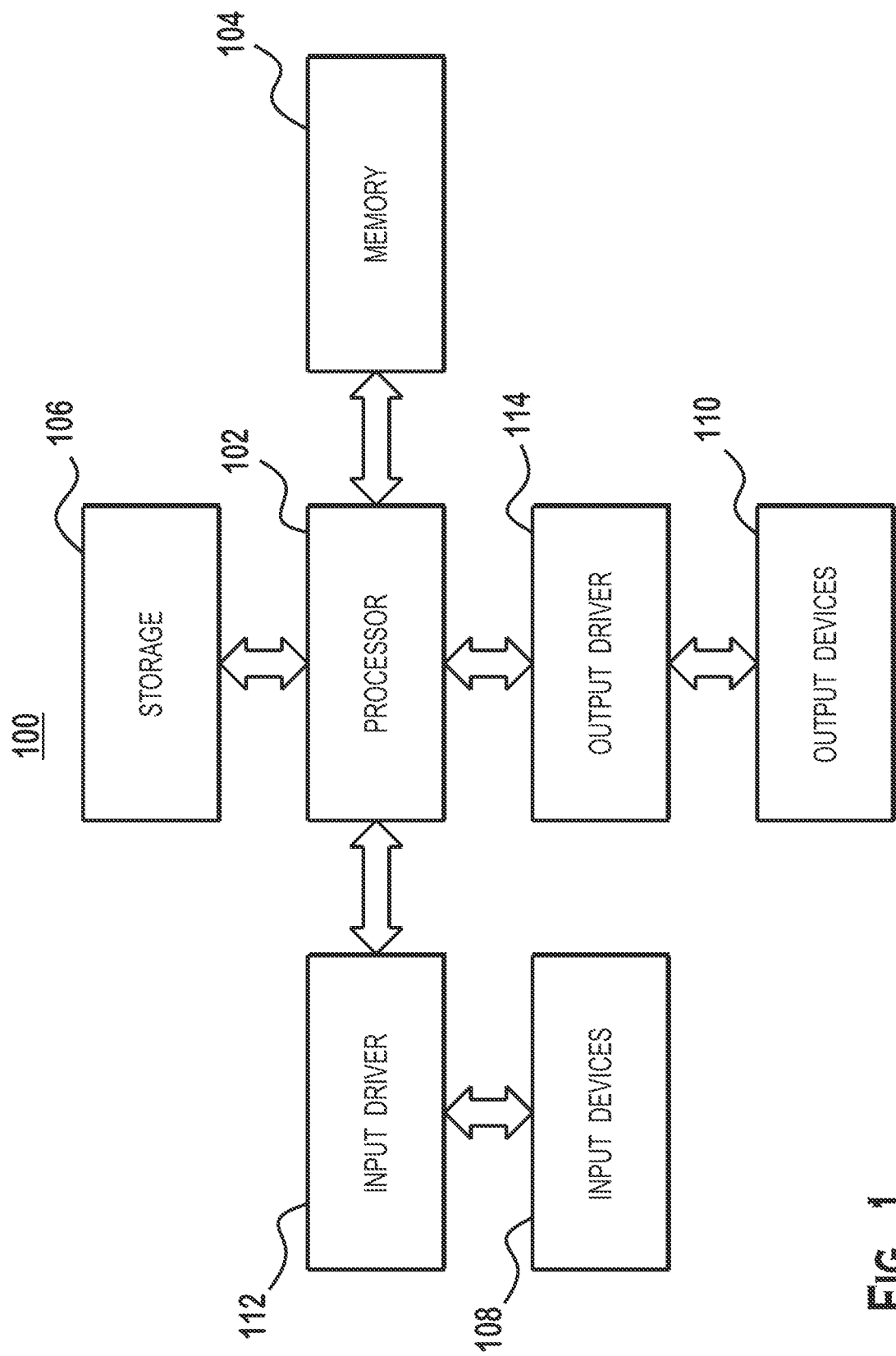
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
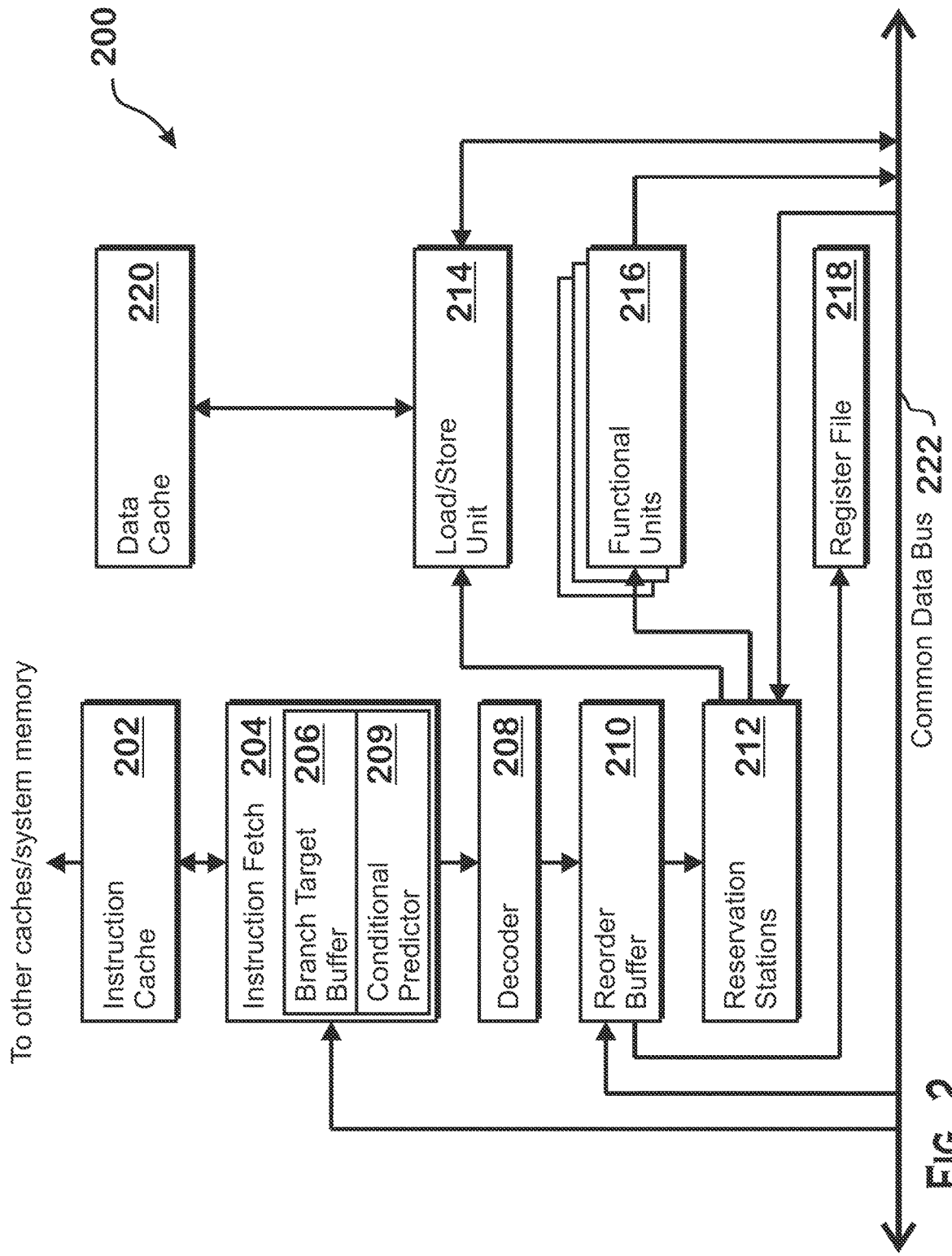
FIG. 2 is a block diagram of an instruction execution pipeline, located within the processor of FIG. 1.

FIG. 2 is a block diagram of an instruction execution pipeline 200, located within the processor 102 of FIG. 1. Although one specific configuration for an instruction execution pipeline 200 is illustrated, it should be understood that any instruction execution pipeline 200 that uses a branch target buffer to prefetch instructions into an instruction cache falls within the scope of the present disclosure. The instruction execution pipeline 200 retrieves instructions from memory and executes the instructions, outputting data to memory and modifying the state of elements associated with the instruction execution pipeline 200, such as registers within register file 218.

The instruction execution pipeline 200 includes an instruction fetch unit 204 that fetches instructions from system memory (such as memory 104) using an instruction cache 202, a decoder 208 that decodes fetched instructions, functional units 216 that perform calculations to process the instructions, a load store unit 214 that loads data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. The term "in-flight instructions" refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Typically, the instruction fetch unit 204 fetches instructions sequentially in memory. Sequential control flow may be interrupted by branch instructions, which causes the instruction pipeline 200 to fetch instructions from a non-sequential address. Branch instructions may be conditional, causing a branch only if a particular condition is satisfied, or non-conditional, and may specify a target directly or indirectly. Direct targets are specified by constants in the instruction byte itself and indirect targets are specified by values in a register or in memory. Direct and indirect branches may be conditional or non-conditional.

Sequential fetching of instructions is relatively simple for the instruction execution pipeline 200. The instruction fetch unit 204 sequentially fetches large chunks of contiguously stored instructions for execution. However, a branch instruction may interrupt such fetching for a few reasons. More specifically, depending on the type of branch instruction, any or all of the following may happen for execution of the branch instruction: the instruction decoder 208 determines that the instruction is in fact a branch instruction, the functional units 216 calculate a target for the branch instruction, and the functional units 216 evaluate the conditional of the branch instruction. Because a delay exists between when a branch instruction is fetched and issued for execution by the instruction fetch unit 204 and when the branch instruction is actually executed by the instruction execution pipeline 200, the instruction fetch unit 204 includes a branch target buffer 206. In brief, the branch target buffer 206 caches the prediction block addresses of previously encountered branch or jump instructions, along with the target of that branch or jump instruction. When fetching instructions to be executed, the instruction fetch unit 204 provides one or more addresses corresponding to the next one or more instructions to be executed to the branch target buffer 206. If an entry exists in the BTB 206 corresponding to a provided address, this means that the BTB 206 predicts the presence of a branch instruction. In this instance, the instruction fetch unit 204 obtains the target of that taken branch from the BTB 206 and begins fetching from that target if the branch is an unconditional branch or a conditional branch predicted to be taken.

In some implementations, the instruction fetch unit 204 performs prefetch operations, in which the instruction fetch unit 204 prefetches instructions into the instruction cache 202 in anticipation of those instruction eventually being provided to the rest of the instruction execution pipeline 200. In some implementations, performing such prefetch operations includes testing upcoming instructions in the instruction cache 202 for hits in the branch target buffer 206. If a hit occurs, then the instruction fetch unit 204 prefetches instructions from the target of the hit (i.e., the target address specified by the entry in the branch target buffer 206) into the instruction cache 202 and if no hit occurs, then the instruction fetch unit 204 prefetches instructions sequentially into the instruction cache 202. Prefetching instructions sequentially means prefetching instructions that are at an address that is subsequent to the address of instructions previously prefetched. In an example, the instruction fetch unit 204 prefetches a first cache line into the instruction cache 202, detects no BTB hits in that cache line, and prefetches a second cache line that is consecutive to the first cache line into the instruction cache 202.

Figure 3:
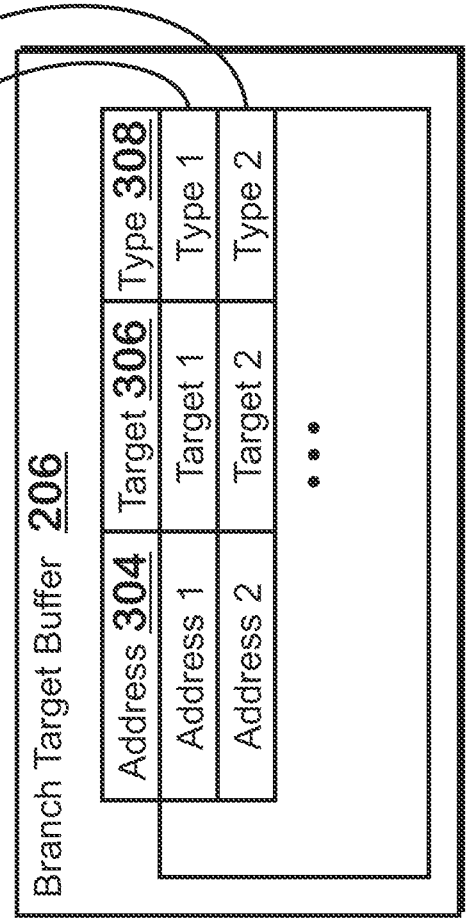
FIG. 3 is a block diagram of an example branch target buffer, according to an example.

FIG. 3 is a block diagram of an example branch target buffer 206, according to an example. The branch target buffer 206 includes multiple BTB entries 302. Each BTB entry 302 includes a prediction block address 304, a target 306, and a branch type 308. The prediction block address 304 indicates the start address of a block of instructions containing the previously encountered branch. In some implementations, a new prediction block is started if a cache line boundary is crossed. The target 306 is the target address of that branch. The branch type 308 encodes the type of branch. Examples of the branch type include a conditional branch that branches to a target address based on the result of a conditional evaluation or a non-conditional branch (or "jump") instruction that always results in a jump to the target of that instruction. In various implementations, the BTB 206 is direct mapped, set associative, or fully associative.

In operation, as the instruction fetch unit 204 fetches instructions into the instruction cache 202, the instruction fetch unit 204 compares the addresses of the fetched instructions to the prediction block addresses 304 of the BTB entries 302. A match is referred to as a hit and results in the instruction fetch unit 204 fetching instructions at the target 306 of the BTB entry 302 for which the hit occurred if the branch type 308 is unconditional or if the branch type 308 is conditional and predicted to be taken by the conditional branch predictor 209. In the event of no match in the BTB 206, which is referred to as a miss, or a hit for a conditional branch that is predicted not taken, the instruction fetch unit 204 fetches instructions sequentially into the instruction cache 202. Sequential fetching means fetching instructions that are sequential in memory to the instructions for which the BTB miss occurred. For example, if the BTB 206 tests an entire cache line of instructions for a hit and no hit occurs, then sequential fetching includes fetching the cache line at the subsequent cache line aligned memory address to the tested cache line.

The predictions made by the branch target buffer 206 are sometimes incorrect. In an example, an entry in the branch target buffer 206 indicates that an instruction at an address results in control flowing to the indicated target. However, when that instruction is actually evaluated by the functional units 216, the instruction instead causes control to flow to a different address. In an example, the BTB entry for the address of the instruction is originally placed into the BTB 206 due to a conditional branch being taken, but the next time that conditional branch instruction is executed, that branch instruction is not taken. In this instance, the BTB 206 updates a conditional predictor to improve taken/not-taken accuracy. In another example, a miss occurs in the BTB 206, because no entry corresponding to the address of a branch instruction exists in the BTB 206, but that branch instruction actually results in non-sequential control flow when evaluated by the functional units 216. In this instance, the BTB 206 creates a new BTB entry 302 for the newly encountered branch instruction that indicates the target of the branch instruction.

As described above, when a miss occurs in the BTB 206, the instruction fetch unit 204 prefetches instructions sequentially into the instruction cache 202. In certain circumstances, this type of activity is beneficial, as a miss in the BTB 206 generally means that no branch exists for a currently examined set of instructions, and thus that instructions should be fetched sequentially. Even when some entries 302 in the BTB 206 are wrong or when some BTB entries 302 for branches in instructions being examined are not present in the BTB 206, the expectation is often that at least some of the predictions made by the BTB 206 will be correct and thus that the instructions prefetched into the instruction cache 202 will be used for a later fetch prior to being evicted from the instruction cache. However, when control flows to a completely new section that has not been encountered recently, most or all branches in that new section will not have corresponding entries in the BTB 206. Thus, the instruction fetch unit 204 would cause sequential prefetching to occur in the instruction cache 202. One issue with this mode of operation is that the prefetching that occurs is highly likely to prefetch a large number of instructions into the cache 202 that would be unused in subsequent execution. This activity is sometimes undesirable for at least the following reasons: cache traffic consumes power, and cache traffic that prefetches instructions that are unused represents wasted power consumption; in some implementations, the instruction cache 202 shares bandwidth with other caches and thus usage of that bandwidth for the instruction cache 202 reduces the available bandwidth for other cache traffic; and placing instructions into the instruction cache 202 that are not used later evicts other instructions that may be used, which results in a delay for re-fetching the evicted instructions and in additional cache traffic occurring in the future.

Figure 4:
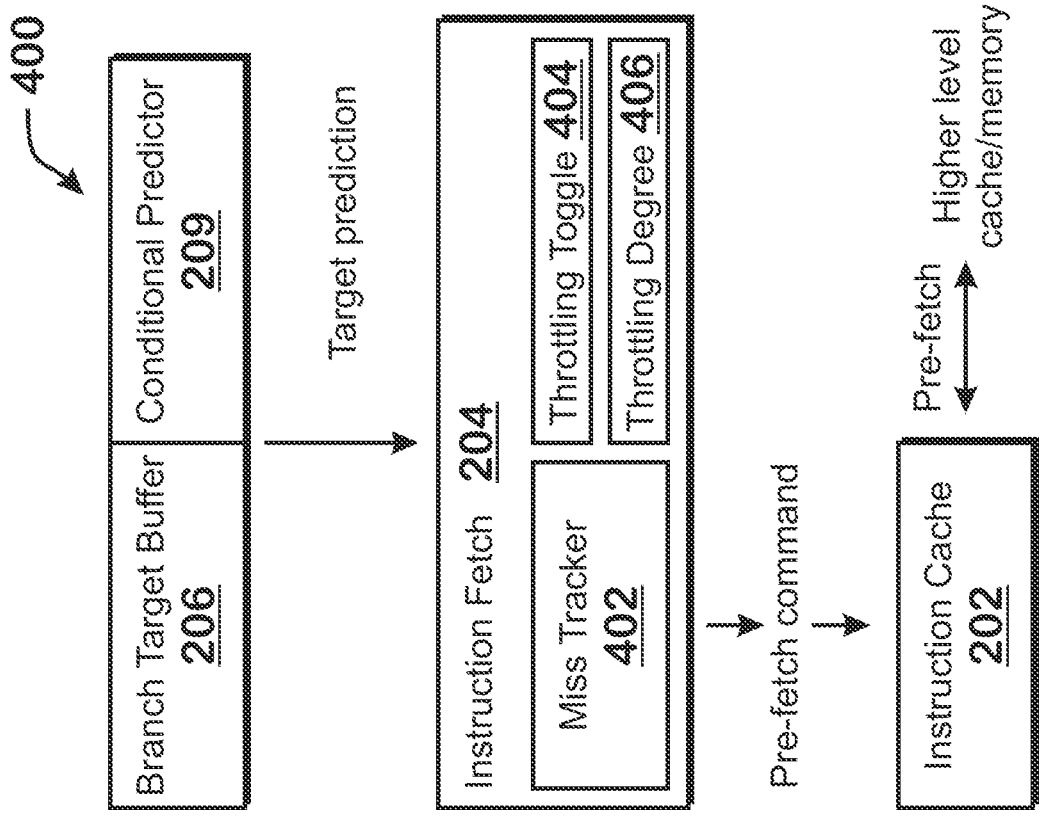
FIG. 4 illustrates example operations for throttling instruction cache prefetches.

FIG. 4 illustrates example operations for throttling instruction cache prefetches. According to these operations, the instruction fetch unit 204 throttles prefetches into the instruction cache 202 based on a throttling toggle 404 and, if used, a throttling degree 406. More specifically, if the throttling toggle 404 indicates that the instruction fetch unit 204 is to throttle instruction cache prefetches, then the instruction fetch unit 204 throttles instruction cache prefetches and if the throttling toggle 404 indicates that the instruction fetch unit 204 is not to throttle instruction cache prefetches, then the instruction fetch unit 204 does not throttle instruction cache prefetches. The throttling degree 406, if used, indicates the degree to which throttling occurs. The throttling toggle 404 and throttling degree 406 represent data stored in a memory location such as a register, memory, or the like. The throttling toggle 404 and throttling degree 406 are set according to techniques described elsewhere herein, such as in paragraphs below.

Additional example details for the instruction cache prefetch throttling technique are now discussed.

If the throttling toggle 404 indicates that prefetching is to occur into the instruction cache 202, then such prefetching occurs in the following manner. The branch target buffer 206 receives instruction addresses from the instruction fetch unit 204 to determine where to prefetch. In some implementations, the instruction addresses provided by the instruction fetch unit 204 follow the predictions of the branch target buffer 206 until corrected by the functional units 216. More specifically, the instruction fetch unit 204 identifies a predicted next address to fetch from based on whether there is a hit or a miss in the branch target buffer 206, and then prefetches from that target, repeating in that fashion. If prefetched instructions include a branch that was not predicted by the branch target buffer 206 or if the branch target buffer 206 predicted a branch that did not exist or was not taken, then the functional units 216 detect such an error and the instruction fetch unit 204 begins prefetching from the correct addresses as specified by the functional units 216. Note, the functional units 216 are the units that actually "execute" branch instructions, for example, by performing target address calculation and performing conditional evaluation, and thus correct prediction errors made by the instruction fetch unit 204 and branch target buffer 206. Thus prefetching into the instruction cache 202 occur based on instruction addresses provided by the execution path predicted by the branch target buffer 206.

As described above, if the throttling toggle 404 indicates that throttling should occur, then the instruction fetch unit 204 throttles instruction cache prefetches. In one example, throttling instruction cache prefetches occurs by limiting the number of outstanding prefetches waiting for a response from a lower level cache (e.g., the number of level 1 cache fills that are waiting for response from a level 2 cache). In another example the limit of number of outstanding prefetches excludes any prefetches requested prior to a branch prediction correction from the functional unit. In another example, throttling instruction cache prefetches occurs by limiting the rate at which prefetches are requested. In another example, throttling instruction cache prefetches occurs by prefetching instructions to fewer caches in the instruction cache hierarchy (e.g., prefetching to a level 3 cache, but not to a level 2 cache or a level 1 cache, prefetching to a level 3 cache and a level 2 cache but not to a level 1 cache, or the like). In examples where the throttling degree 406 is used, the throttling degree indicates the number of prefetches that are outstanding, the rate at which prefetches are requested, and the number of caches in the instruction cache hierarchy to which instructions are prefetched.

Techniques for setting the throttling toggle 404 and, if used, the throttling degree 406, are now discussed. A miss tracker 402 detects and records misses in the branch target buffer 206 and misses in the instruction cache 202, indicating a line that was likely not encountered before. Based on misses encountered in the branch target buffer 206 and misses in the instruction cache 202, the miss tracker 402 modifies the throttling toggle 404 and, in implementations that vary the degree of throttling, the throttling degree 406.

Several examples of ways in which the miss tracker 402 modifies the throttling toggle 404 are now provided. In a first example, the miss tracker 402 tracks the number of consecutive lookups that miss in the branch target buffer 206 and the instruction cache ("IC") 202. If the number of such consecutive misses is above a threshold, then the miss tracker 402 sets the throttling toggle 404 to indicate that prefetching should be throttled. If the number of consecutive misses is not above the threshold, then the miss tracker 402 sets the throttling toggle 404 to indicate that the prefetching should not be throttled. A consecutive miss in the BTB 206 is a miss that occurs after another miss without a hit between those two misses, where the term "after" refers to a subsequent memory address. In an example, a miss occurs for a first memory address in the BTB 206, and then for the immediately subsequent address, another miss occurs. In this example, the two misses are considered consecutive misses. In another example, a miss occurs for a first memory address in the BTB 206 and instruction cache ("IC") 202, then a hit occurs for an immediately subsequent address, and then a miss occurs for an immediately subsequent address. In this example, the two misses are not considered consecutive. Note that in some examples, the addresses are addresses of cache lines and the BTB 206 includes entries for individual cache lines. A hit in the BTB 206 is a hit for the address of the cache line, and means that the BTB 206 predicts that at least one instruction in the cache line is a branch. A miss in the BTB 206 is a miss for the address of the cache line and means that the BTB 206 predicts that no instruction in the cache line is a branch.

In a second example, the miss tracker 402 tracks a number of consecutive misses in the branch target buffer 206 and the instruction cache 202 and also tracks the total number of such outstanding misses that are missed in both the branch target buffer 206 and the instruction cache 202. An outstanding miss in this case is a request sent by the instruction fetch unit to the lower levels of cache after missing in the instruction cache 202 and the branch target buffer 206. The counter for outstanding misses is decremented when the lower levels of cache return with data for one of these misses. This data is then installed in the instruction cache 202.

In the second example, if the number of consecutive misses is above a first threshold and the number of outstanding misses is above a second threshold, then the miss tracker 402 modifies the throttling toggle 404 to indicate that instruction prefetch throttling for the instruction cache 202 is to occur. If the number of consecutive misses is below the first threshold or the number of outstanding misses is below the second threshold, then the miss tracker 402 modifies the throttling toggles 404 to indicate that instruction prefetch throttling for the instruction cache 202 is not to occur. In implementations where a throttling degree 406 is used, the miss tracker 402 increases the throttling degree 406 if the number of consecutive or outstanding misses increases and decreases the throttling degree 406 if the number of consecutive or outstanding misses decreases.

In a third example, the miss tracker 402 tracks a number of outstanding misses. In response to the number of outstanding misses exceeding a first threshold, the miss tracker 402 begins tracking a number of consecutive misses. In response to the number of consecutive misses exceeding a second threshold, the miss tracker 402 sets the throttling toggle 404 to indicate that throttling is enabled. In response to the number of consecutive misses being below a third threshold or in response to the number of outstanding misses being below a fourth threshold, the miss tracker 402 sets the throttling toggle 404 to indicate that throttling is disabled. In implementations where a throttling degree 406 is used, the miss tracker 402 increases the throttling degree 406 if the number of consecutive or outstanding misses increases and decreases the throttling degree 406 if the number of consecutive or outstanding misses decreases.

In some implementations, in an extension to the above techniques, including any of the first, second or third examples above, the miss tracker 402 tracks instruction cache misses and not BTB misses. In implementations where the miss tracker 402 tracks instruction cache misses, an outstanding miss is defined as an instruction cache miss that resulted in a request for bytes to the lower levels of cache where the request has not been fulfilled yet. In such implementations, the miss tracker 402 tracks the total number of outstanding instruction cache misses and the number of consecutive instruction cache misses. If the number of consecutive misses is above a first threshold and the number of instruction cache misses is above a second threshold, then the miss tracker 402 sets the throttling toggle to indicate that throttling should occur. The miss tracker 402 sets the throttling toggle 404 to indicate that throttling should not occur if the number of instruction cache misses is below the first threshold or the number of consecutive instruction cache misses is below a second threshold.

In some implementations, BTB lookups are performed on a per-cache-line basis. More specifically, the address that the instruction fetch unit 204 provides to the branch target buffer 206 is aligned to the size of a cache line. Moreover, entries in the BTB 206 store one or more branch targets for whole cache lines. If a cache line address is provided to such a BTB 206, and there is no entry corresponding to that cache line address, then a miss occurs. Such a miss is considered outstanding until the instruction pipeline 200 either confirms that no branches are in the cache line or identifies one or more branches in the cache line and the targets of those branches. Consecutive misses occur in the event that misses occur for two or more sequential cache line addresses. Some BTBs 206 include entries that store up to a certain number of branches per cache line, and therefore it is possible for there to be multiple BTB entries per cache line, if the cache line includes more than the maximum number of branches in a BTB entry.

Note that the branch target buffer 206 is shown as being included in the instruction fetch unit 204 in FIG. 2, but it should be understood that interactions between the instruction fetch unit 204 and the branch target buffer 206, such as applying the instruction address to the branch target buffer 206, are performed by appropriate entities on the instruction fetch unit 204 such as fixed function or programmable circuits.

In some examples, when a branch mispredict occurs, the count of the number of outstanding prefetches is reset and/or the count of the number of outstanding instruction cache misses is reset.

Figure 5:
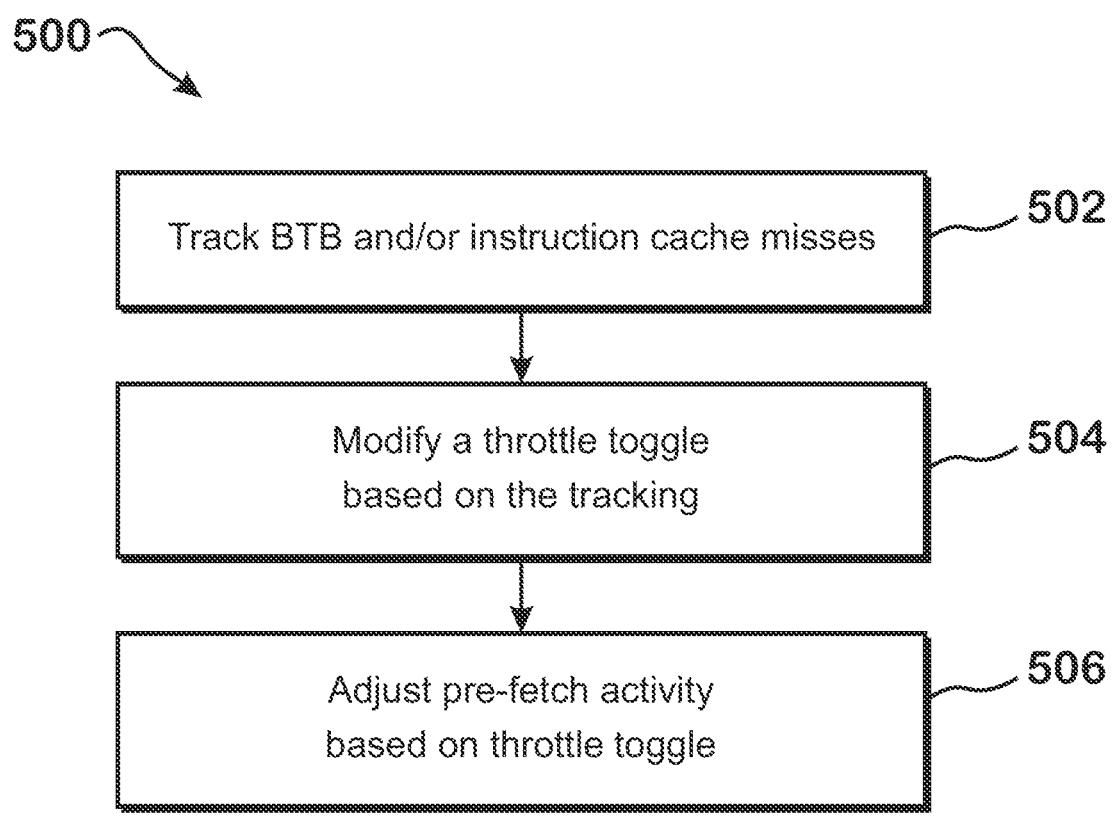
FIG. 5 is a flow diagram of a method for prefetching instructions into an instruction cache, according to an example.

FIG. 5 is a flow diagram of a method 500 for prefetching instructions into an instruction cache, according to an example. Although the method 500 is described with respect to the system of FIGS. 1-4, those of skill in the art will recognize that any system, configured to perform the steps of the method 500 in any technically feasible order, falls within the scope of the present disclosure.

The method 500 begins at step 502, where a miss tracker 402 tracks BTB 206 misses and/or instruction cache 202 misses. There are many ways in which the miss tracker 402 may track such misses. In one example, the miss tracker 402 tracks the number of consecutive misses in the BTB 206 and instruction cache 202. As described elsewhere herein, consecutive misses in the BTB 206 and IC 202 are two or more misses that occur without an intervening hit in the BTB 206 or IC 202. An intervening hit is a hit that occurs for an address that is in between the two consecutive misses. In a second example, the miss tracker 402 tracks the number of outstanding misses and consecutive misses in the BTB 206 and the IC 202. In a third example, the miss tracker 402 tracks a number of outstanding misses, and if the number of outstanding misses is above a threshold, tracks a number of consecutive misses. In some implementations, as a variation of any of the above examples, the miss tracker 402 tracks only cache misses in the instruction cache 202.

At step 504, the miss tracker 402 modifies a throttling toggle 404 based on the tracking. In the example where the miss tracker 402 tracks the number of consecutive BTB misses, if the number of consecutive misses is above a first threshold, then the miss tracker 402 sets the throttling toggle 404 to indicate that prefetching should be throttled. If the number of consecutive misses is not above a second threshold, then the miss tracker 402 sets the throttling toggle 404 to indicate that the prefetching should not be throttled. In some examples, the first threshold is the same as the second threshold and in other examples, the first threshold is different than the second threshold.

In the example where the miss tracker 402 tracks both a number of consecutive misses in the branch target buffer 206 and a number of outstanding misses in the branch target buffer 206, if the number of consecutive misses is above a first threshold and the number of outstanding misses is above a second threshold, then the miss tracker 402 modifies the throttling toggle 404 to indicate that instruction prefetch throttling for the instruction cache 202 is to occur. If the number of consecutive misses is below a third threshold or the number of outstanding misses is below a fourth threshold, then the miss tracker 402 modifies the throttling toggles 404 to indicate that instruction prefetch throttling for the instruction cache 202 is to not occur. In some implementations, the third threshold is the same as the first threshold. In some implementations, the third threshold is different than the first threshold. In some implementations, the second threshold is the same as the fourth threshold. In some implementations, the second threshold is different than the fourth threshold. In implementations where a throttling degree 406 is used, the miss tracker 402 increases the throttling degree 406 if the number of consecutive or outstanding misses increases and decreases the throttling degree 406 if the number of consecutive or outstanding misses decreases.

In another example, the miss tracker 402 tracks a number of outstanding misses, and, in response to the number of outstanding misses exceeding a first threshold, the miss tracker 402 begins tracking a number of consecutive misses. In this example, in response to the number of consecutive misses exceeding a second threshold, the miss tracker 402 sets the throttling toggle 404 to indicate that throttling is enabled. In response to the number of consecutive misses being below a third threshold or in response to the number of outstanding misses being below a fourth threshold, the miss tracker 402 sets the throttling toggle 404 to indicate that throttling is disabled. In implementations where a throttling degree 406 is used, the miss tracker 402 increases the throttling degree 406 if the number of consecutive or outstanding misses increases and decreases the throttling degree 406 if the number of consecutive or outstanding misses decreases.

In some implementations, as a variation to the above techniques, including any of the first, second, or third examples above, the miss tracker 402 tracks only instruction cache misses.

At step 506, the instruction fetch unit 204 adjusts instruction prefetch activity in accordance with the throttle toggle 404. In implementations where a throttling degree 406 is used, the instruction fetch unit 204 adjusts the instruction prefetch activity in accordance with the throttling degree 406. Adjusting the prefetch activity based on the throttling toggle includes switching on instruction prefetch into the instruction cache 202 if the throttle toggle 404 is on and switching off instruction prefetch into the instruction cache 202 if the throttle toggle 404 is off. In implementations where the throttling degree 406 is used, the instruction fetch unit 204 adjusts the degree to which prefetching occurs based on the throttling degree 406. In general, a higher throttling degree 406 means that less prefetching occurs and a lower throttling degree 406 means that more prefetching occurs. In some examples, more prefetching is associated with prefetching more instructions than less prefetching and in other examples, more prefetching is associated with prefetching instructions to more caches than less prefetching.

Presented herein is a method for controlling prefetching of instructions into an instruction cache. The method includes tracking either or both of branch target buffer misses and instruction cache misses. The method includes modifying a throttle toggle based on the tracking. The method also includes adjusting prefetch activity based on the throttle toggle.

In some implementations, the method includes modifying a throttling degree based on the tracking, wherein adjusting the prefetch activity is also performed based on the throttling degree. In some implementations, the tracking includes detecting that a number of consecutive branch target buffer and instruction cache misses is above a first threshold, and, in response, setting the throttle toggle to indicate that instruction cache prefetching is to be throttled.

In some implementations, the tracking includes detecting that a number of consecutive branch target buffer misses and instruction cache misses is not above a first threshold, and, in response, setting the throttle toggle to indicate that instruction cache prefetching is not to be throttled. In some implementations, the tracking includes detecting that a number of consecutive branch target buffer misses and instruction cache misses is above a first threshold and that a number of such outstanding branch target buffer misses and instruction cache misses is above a second threshold, and, in response, setting the throttle toggle to indicate that instruction cache prefetching is to be throttled. In some implementations, the tracking includes detecting either that a number of consecutive branch target buffer and instruction cache misses is not above a first threshold or that a number of outstanding branch target buffer and instruction cache misses is not above a second threshold, and, in response, setting the throttle toggle to indicate that instruction cache prefetching is not to be throttled. In some implementations, the tracking includes in response to detecting that a number of outstanding branch target buffer and instruction cache misses is above a first threshold, tracking a number of such consecutive branch target buffer and instruction cache misses, and in response to detecting that the number of consecutive branch target buffer misses is above a second threshold, setting the throttle toggle to indicate that instruction cache prefetching is to be throttled. In some implementations, the tracking includes tracking outstanding and consecutive instruction cache misses and not tracking branch target buffer misses.

It should be understood that many variations are possible based on the disclosure herein. Although features and elements are described above in particular combinations, each feature or element may be used alone without the other features and elements or in various combinations with or without other features and elements.

The various functional units illustrated in the figures and/or described herein (including, where appropriate, the processor 102, the input driver 112, the input devices 108, the output driver 114, the output devices 110, the instruction cache 202, the instruction fetch unit 204, the branch target buffer 206, the decoder 208, the reorder buffer 210, the reservation stations 212, the data cache 220, the load/store unit 214, the functional units 216, the register file 218, the common data bus 222, and the miss tracker 402) may be implemented as hardware circuitry, software executing on a programmable processor, or a combination of hardware and software. The methods provided may be implemented in a general purpose computer, a processor, or a processor core.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for controlling prefetching of instructions into an instruction cache, the method comprising:
    tracking a number of misses in a branch target buffer and the instruction cache, wherein the number of misses indicates a number of consecutive branch target buffer and instruction cache misses;
    modifying a throttle toggle based on the tracking; and
    adjusting prefetch activity for the instruction cache based on the throttle toggle.
2. The method of claim 1, further comprising:
    modifying a throttling degree based on the tracking, wherein the throttling degree indicates a degree to which throttling occurs,
    wherein adjusting the prefetch activity is also performed based on the throttling degree.
3. The method of claim 1, wherein:
    the tracking comprises detecting that the number of consecutive branch target buffer and instruction cache misses is above a first threshold, and, in response, the modifying comprises setting the throttle toggle to indicate that instruction cache prefetching is to be throttled.
4. The method of claim 1, wherein:
    the tracking comprises detecting that the number of consecutive branch target buffer and instruction cache misses is not above a first threshold, and, in response, the modifying comprises setting the throttle toggle to indicate that instruction cache prefetching is not to be throttled.
5. The method of claim 1, wherein:
    the tracking comprises detecting that the number of consecutive branch target buffer and instruction cache misses is above a first threshold and that a number of outstanding branch target buffer and instruction cache misses is above a second threshold, and, in response, the modifying comprises setting the throttle toggle to indicate that instruction cache prefetching is to be throttled.
6. The method of claim 1, wherein the tracking comprises:
    not determining the number of misses in the instruction cache.
7. The method of claim 1, wherein the tracking comprises:
    not determining the number of misses in the branch target buffer.
8. The method of claim 2, wherein the throttling degree indicates one of a number of instructions that are prefetched or a number of caches into which prefetching of instructions occurs.
9. An instruction fetching system for controlling prefetching of instructions into an instruction cache, the instruction fetching system comprising:
    a branch target buffer; and
    a miss tracker configured to:
        track a number of misses in a branch target buffer and the instruction cache, wherein the number of misses indicates a number of consecutive branch target buffer and instruction cache misses;
        modify a throttle toggle based on the tracking; and
        adjust prefetch activity for the instruction cache based on the throttle toggle.
10. The instruction fetching system of claim 9, wherein the miss tracker is further configured to:
    modify a throttling degree based on the tracking, wherein the throttling degree indicates a degree to which throttling occurs,
    wherein adjusting the prefetch activity is also performed based on the throttling degree.
11. The instruction fetching system of claim 9, wherein the miss tracker is further configured to:
    detect that the number of consecutive branch target buffer and instruction cache misses is above a first threshold, and, in response, the modifying comprises setting the throttle toggle to indicate that instruction cache prefetching is to be throttled.
12. The instruction fetching system of claim 9, wherein the miss tracker is further configured to:
    detect that the number of consecutive branch target buffer and instruction cache misses is not above a first threshold, and, in response, the modifying comprises setting the throttle toggle to indicate that instruction cache prefetching is not to be throttled.
13. The instruction fetching system of claim 9, wherein the miss tracker is further configured to:
    detect that the number of consecutive branch target buffer and instruction cache misses is above a first threshold and that a number of outstanding branch target buffer and instruction cache misses is above a second threshold, and, in response, the modifying comprises setting the throttle toggle to indicate that instruction cache prefetching is to be throttled.
14. The instruction fetching system of claim 9, wherein:
    the tracking comprises not determining the number of misses in the instruction cache.
15. The instruction fetching system of claim 9, wherein:
    the tracking comprises not determining the number of misses in the branch target buffer.
16. The instruction fetching system of claim 10, wherein the throttling degree indicates one of a number of instructions that are prefetched or a number of caches into which prefetching of instructions occurs.

17. A processor comprising:
an instruction cache;
a branch target buffer; and
a miss tracker configured to:
track a number of misses in the branch target buffer and the instruction cache, wherein the number of misses indicates a number of consecutive branch target buffer and instruction cache misses;
modify a throttle toggle based on the tracking; and
adjust prefetch activity for the instruction cache based on the throttle toggle.

18. The processor of claim 17, wherein the miss tracker is further configured to:
modify a throttling degree based on the tracking, wherein the throttling degree indicates a degree to which throttling occurs,
wherein adjusting the prefetch activity is also performed based on the throttling degree.

19. The processor of claim 17, wherein the miss tracker is further configured to:
detect that the number of consecutive branch target buffer and instruction cache misses is above a first threshold, and, in response, the modifying comprises setting the throttle toggle to indicate that instruction cache prefetching is to be throttled.

20. The processor of claim 17, wherein the miss tracker is further configured to:
detect that the number of consecutive branch target buffer and instruction cache misses is not above a first threshold, and, in response, the modifying comprises setting the throttle toggle to indicate that instruction cache prefetching is not to be throttled.

21. The processor of claim 17, wherein the miss tracker is further configured to:
detect that the number of consecutive branch target buffer and instruction cache misses is above a first threshold and that a number of outstanding branch target buffer and instruction cache misses is above a second threshold, and, in response, the modifying comprises setting the throttle toggle to indicate that instruction cache prefetching is to be throttled.

22. The processor of claim 17, wherein:
the tracking comprises not determining the number of misses in the instruction cache.

23. The processor of claim 17, wherein:
the tracking comprises not determining the number of misses in the branch target buffer.

24. The processor of claim 18, wherein the throttling degree indicates one of a number of instructions that are prefetched or a number of caches into which prefetching of instructions occurs.

* * * * *